(12) United States Patent
Chang et al.

(10) Patent No.: US 7,925,109 B2
(45) Date of Patent: Apr. 12, 2011

(54) SYSTEM AND METHOD FOR SIMPLIFYING A POINT CLOUD

(75) Inventors: Chih-Kuang Chang, Taipei-Hsien (TW); Shan-Yang Fu, Shenzhen (CN); Xin-Yuan Wu, Shenzhen (CN); Xiao-Chao Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 749 days.

(21) Appl. No.: 12/014,110

(22) Filed: Jan. 15, 2008

(65) Prior Publication Data
US 2009/0055096 A1 Feb. 26, 2009

(30) Foreign Application Priority Data
Aug. 20, 2007 (CN) .......................... 2007 1 0201400

(51) Int. Cl.
*G06K 9/36* (2006.01)
(52) U.S. Cl. ........ 382/254; 382/154; 382/260; 382/274; 382/275; 358/3.26; 358/3.27; 358/463
(58) Field of Classification Search .................. 382/154, 382/260, 274, 275; 358/3.26, 3.27, 463
See application file for complete search history.

(56) References Cited

U.S. PATENT DOCUMENTS

| | | | |
|---|---|---|---|
| 6,819,790 B2 * | 11/2004 | Suzuki et al. ................. | 382/156 |
| 6,996,290 B2 * | 2/2006 | Cariffe .......................... | 382/275 |
| 7,027,054 B1 * | 4/2006 | Cheiky et al. ................. | 345/473 |
| 7,082,356 B2 * | 7/2006 | Mori ............................... | 701/29 |
| 7,298,289 B1 * | 11/2007 | Hoffberg ...................... | 340/903 |
| 7,308,139 B2 * | 12/2007 | Wentland et al. ............. | 382/181 |
| 2006/0116838 A1 | 6/2006 | Chang et al. | |

* cited by examiner

*Primary Examiner* — Yosef Kassa
(74) *Attorney, Agent, or Firm* — Frank R. Niranjan

(57) ABSTRACT

A method for simplifying a point cloud is provided. The method includes: (a) acquiring a point cloud; (b) establishing a topological structure for the point cloud; (c) selecting a maiden point from the point cloud as a selected point; (d) searching a plurality of points which are near to the selected point from the point cloud according to the topological structure as near points of the selected point; (e) fitting the selected point and the near points to form a paraboloid, obtaining curve equations of the paraboloid, and computing a curvature of the selected point according to the curve equations and a curvature formula; (f) repeating the steps from (c) to (e) until the curvatures of all points in the point have been computed; and (g) simplifying the point cloud according to the curvatures of the points and a preconfigured parameter. A related system is also provided.

16 Claims, 7 Drawing Sheets

SYSTEM AND METHOD FOR SIMPLIFYING A POINT CLOUD

BACKGROUND OF THE INVENTION

1. Field of the Invention

The present invention relates to point cloud editing systems and methods, particularly to a system and method for simplifying a point cloud.

2. Description of Related Art

Reverse engineering is that: obtaining a point cloud of an existent object by scanning the object through a high-precision laser scanner; establishing a digitalized model of the object according to the point cloud, and massively manufacturing the objects accurately according to the model through CAM (computer-aided manufacturing).

Usually, the point cloud obtained from the object may contain a good many of points. The quantity of the points in the point cloud may be hundreds of thousands, several million, even several billion. Thus, establishing the model according to the point cloud is complicated and will take long time. Furthermore, the points of the point cloud may be redundancy, even inaccuracy due to various reasons. Thus, the established model may be improper.

Therefore, what is needed is a system and method which can simplify the point cloud and delete the redundancy points from the point cloud.

SUMMARY OF THE INVENTION

A preferred embodiment provides a system for simplifying a point cloud. The system includes an application server and a point cloud obtaining device. The point cloud obtaining device connects with the application. The application server includes: a point cloud acquiring module configured for acquiring a point cloud of an object from the point cloud obtaining device; a topological structure establishing module configured for establishing a topological structure for the point cloud to make points of the point cloud confined in a plurality of related cubical grids; a point selecting module configured for selecting a point from the point cloud as a selected point; a near points searching module configured for searching a plurality of points which are near to the selected point according to the topological structure as near points of the selected point; a curvature computing module configured for fitting a paraboloid for the selected point according to the near points, obtaining a curve equation of the paraboloid according to the selected point and the near points, and computing a curvature of the selected point according to the curve equation and a curvature formula; and a point cloud simplifying module configured for simplifying the point cloud to obtain a tidy point cloud according to a preconfigured parameter and the curvatures of the points in the point cloud.

Another preferred embodiment provides a method for simplifying a point cloud. The method includes steps of: (a) acquiring a point cloud from a point cloud obtaining device; (b) establishing a topological structure for the point cloud; (c) selecting a maiden point from the point cloud as a selected point; (d) searching a plurality of points which are near to the selected point from the point cloud according to the topological structure as near points of the selected point; (e) fitting the selected point and the near points to form a paraboloid, obtaining curve equations of the paraboloid, and computing a curvature of the selected point according to the curve equations and a curvature formula; (f) repeating the steps from (c) to (e) until the curvatures of all points in the point have been computed; and (g) simplifying the point cloud according to the curvatures of the points and a preconfigured parameter.

Other advantages and novel features of the present invention will become more apparent from the following detailed description of preferred embodiment when taken in conjunction with the accompanying drawings, in which:

DETAILED DESCRIPTION OF THE INVENTION

Figure 1:
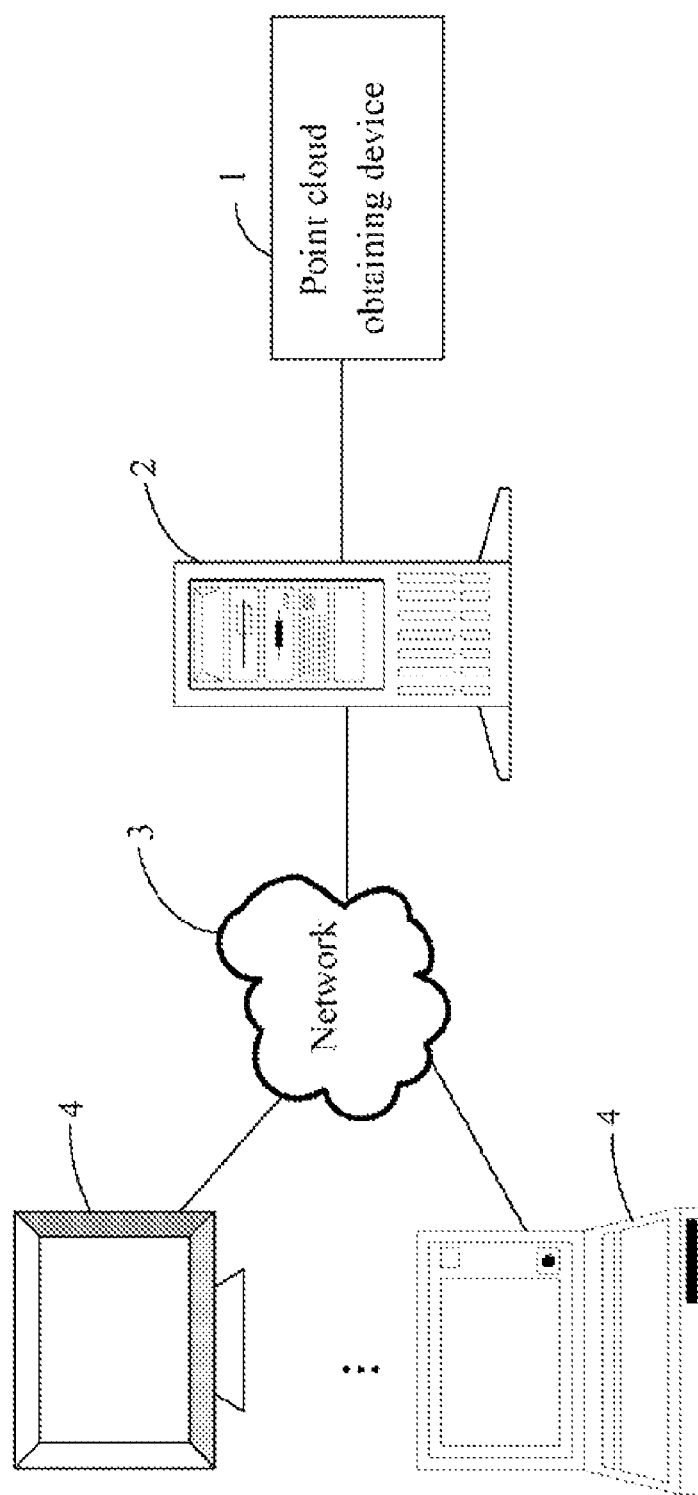
FIG. 1 is a schematic diagram of hardware configuration of a system for simplifying a point cloud in accordance with a preferred embodiment.

FIG. 1 is a schematic diagram of a hardware configuration of a system for simplifying a point cloud (hereinafter, "the system") in accordance with a preferred embodiment. The system typically includes a point cloud obtaining device 1, an application server 2, and a plurality of client computers 4 (only two shown). The client computers 4 connect to the application server 2 via a network 3. The network 3 may be an intranet, the Internet, or any other suitable type of communication links.

The point cloud obtaining device 1 connects with the application server 2, and is provided for obtaining a point cloud by scanning a physical object. In the preferred embodiment, the point cloud obtaining device 1 may be a laser scanner or any other suitable type of device that can obtain the point cloud from the physical object.

The application server 2 is configured for simulating a digitalized figure based on the point cloud, and deleting redundant points from the digitalized figure to obtain a tidy point cloud. The application server 2 is installed with a plurality of software function modules that are used for processing the point cloud. The client computers 4 may be located at various locations (e.g. different internal departments) of an organization with the system. Each client computer 4 provides a graphical user interface for displaying the digitalized figure.

Figure 2:
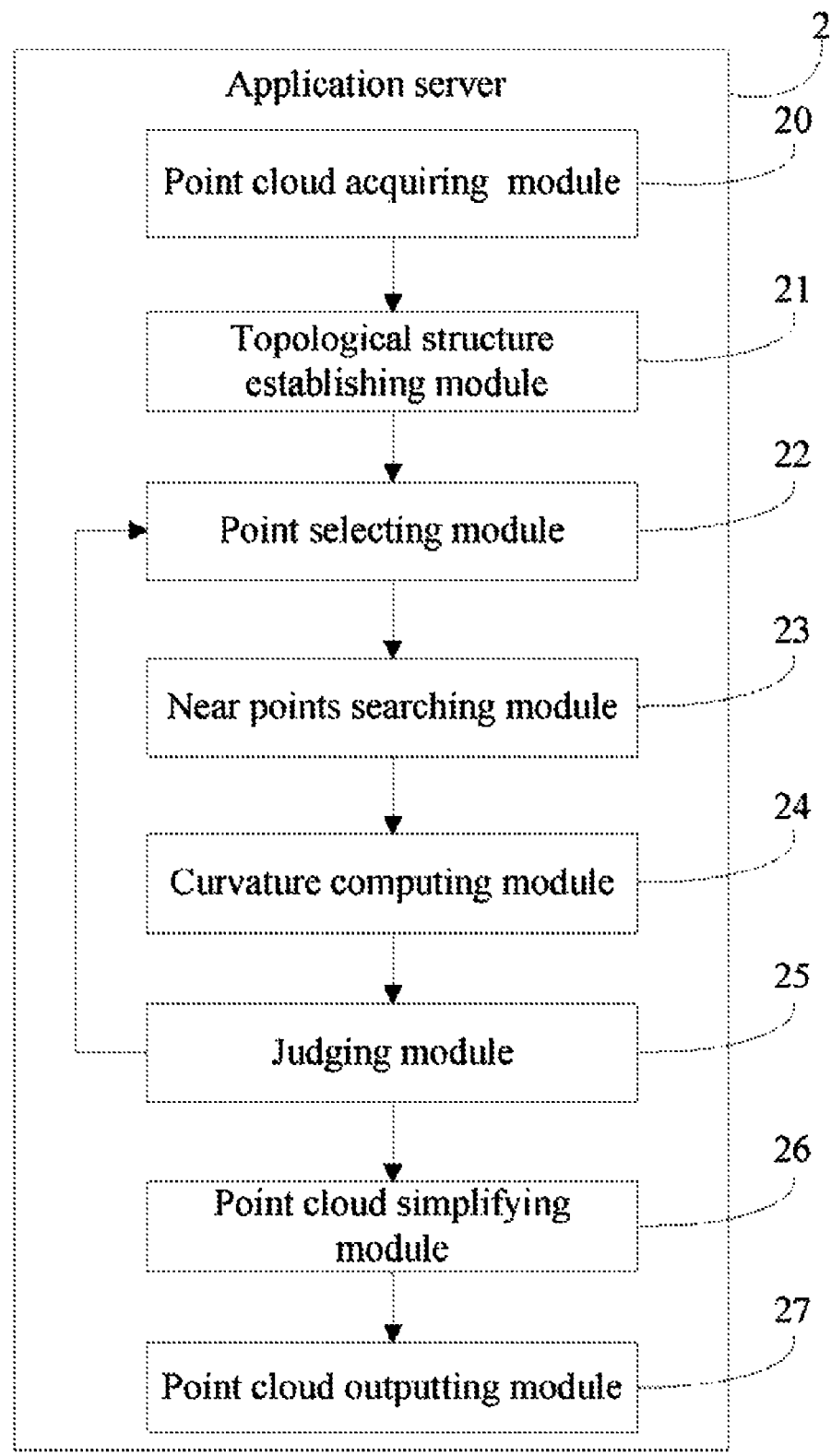
FIG. 2 is a block diagram of function modules of an application server in FIG. 1.

FIG. 2 is a block diagram of function modules of the application server 2 in FIG. 1. The application server 2 typically includes: a point cloud acquiring module 20, a topological structure establishing module 21, a point selecting module 22, a near points searching module 23, a curvature computing module 24, a judging module 25, a point cloud simplifying module 26, and a point cloud outputting module 27.

The point cloud acquiring module 20 is configured for acquiring the point cloud from the point cloud obtaining device 1, simulating the digitalized figure based on the point cloud, and displaying the digitalized figure on the graphical user interface of any client computer 4.

The topological structure establishing module 21 is configured for establishing a topological structure for the point cloud, namely constructing a relationship between the points of the point cloud. Specifically, the topological structure establishing module 21 first identifies an outermost point on each surface edge of the point cloud by analyzing coordinates values of the points in the point cloud, and determines a cubical figure that can confine the point cloud and intersect at the outermost points of the point cloud. Secondly, the topological structure establishing module 21 retrieves a length, a width and a height of the cubical figure. Finally, the topological structure establishing module 21 maps a grid on the cubical figure according to the length, the width, the height of the cubical figure and an axes interval of the grid that is preconfigured by a user. Specifically, the topological structure establishing module 21 first computes an axes quantity in surfaces of the cubical figure according to the length, the width, the height of the cubical figure and the axes interval of the grid, and then grids the cubical figure with a plurality of cubical grids according to the axes quantity of each surface of the cubical figure. Thus, the points of the point cloud may be separately confined in different cubical grids. According to the axes interval of the grid and the density of the point cloud, each cubical grid may confine one or more points of the point cloud. Furthermore, the topological structure establishing module 21 is configured for configuring serial numbers for all cubical grids, for example, "001", "002", . . . , "xxx"; and relating each of the cubical grids with twenty-six cubical grids which are adjacent to the cubical grid in three-dimension by saving the serial numbers of the 27 cubical grids into a table.

The point selecting module 22 is configured for selecting a maiden point which has not been selected (hereinafter referred to as "selected point") from the point cloud.

The near points searching module 23 is configured for searching a plurality of points which are near to the selected point (hereinafter "near points") from the point cloud according to the topological structure. Specifically, the near points searching module 23 first obtains a specified serial number "xxx" of the cubical grid which confines the selected point, then searches twenty-six cubical grids which are adjacent to the cubical grid "xxx" from the cubical figure according to the serial number "xxx", and finally computes distances between the selected point and the points which confined in the twenty-seven cubical grids (including the cubical grid which confines the selected point and the twenty six adjacent cubical grids) to obtain the plurality of near points according to the distances. The quantity of the near points may be different according to uses of the near points.

The curvature computing module 24 is configured for fitting the selected point and the near points to form a paraboloid, obtaining curve equations of the paraboloid according to the selected point and the near points, and computing a curvature of the selected point according to the curve equations and a curvature formula. The better quantity of the near points when fitting the paraboloid is 24~32, and hereinafter the near points which are used for fitting the paraboloid are called paraboloidal near points.

The judging module 25 is mainly configured for determining whether the curvatures of all points in the point cloud have been computed. If no, the point selecting module 22 will select another maiden point from the point cloud.

The point cloud simplifying module 26 is mainly configured for simplifying the point cloud according to the curvatures of the points in the point cloud and a preconfigured parameter. Specifically, the point cloud simplifying module 26 obtains the near points of the selected point, computes an average curvature of the near points, then computes a difference between the curvature of the selected point and the average curvature, and deletes the selected point from the point cloud if the difference is less than the preconfigured parameter, or reserves the selected point in the point cloud if the difference is more than the preconfigured parameter. The better quantity of the near points when computing the average curvature is 9~15, and hereinafter the near points which are used for computing the average curvature are called curvature near points.

The point cloud outputting module 27 is configured for outputting the tidy point cloud on the graphical user interface of each client computer 4.

Figure 3:
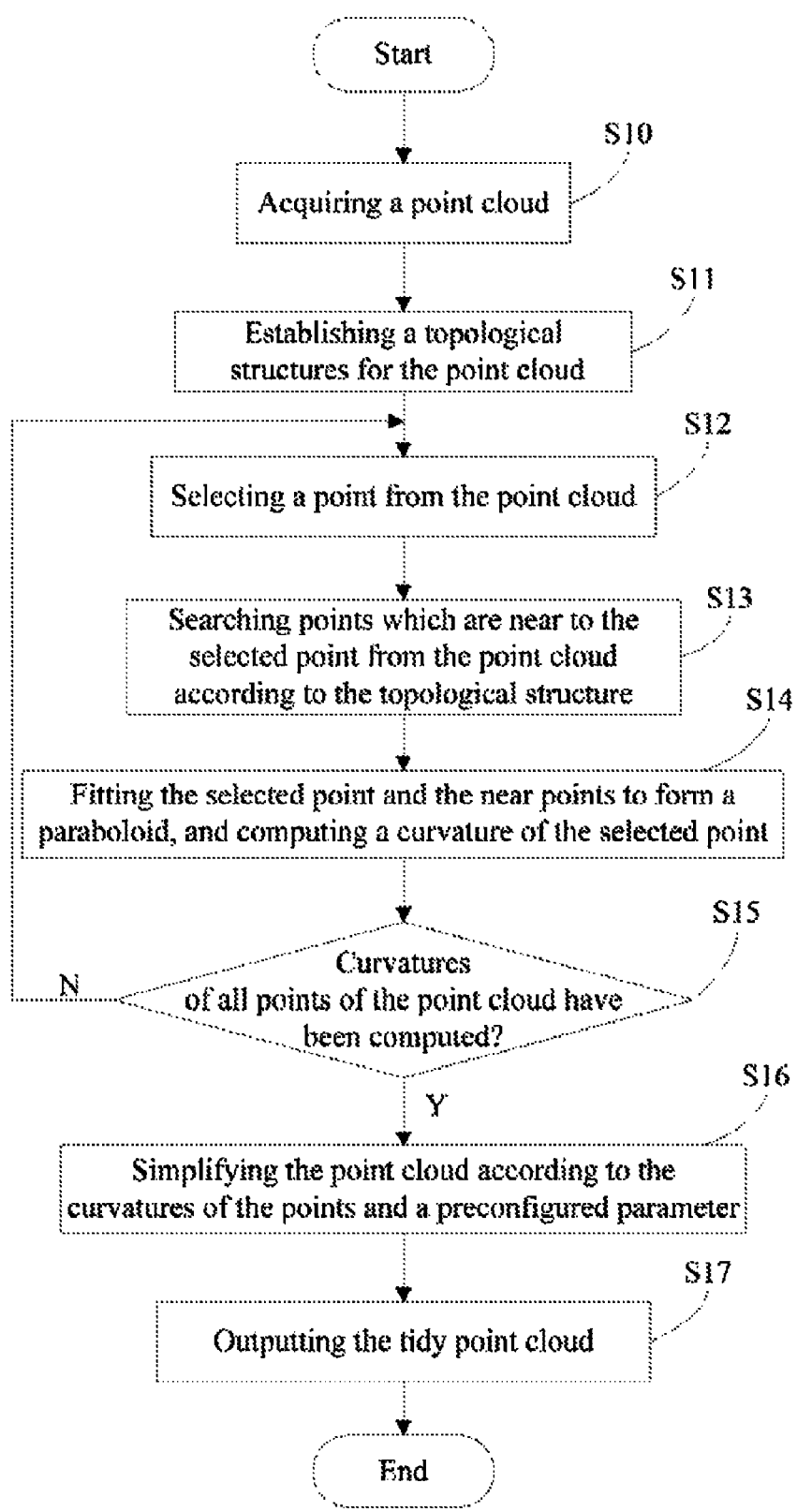
FIG. 3 is a main flowchart illustrating a method for simplifying a point cloud in accordance with a preferred embodiment.

FIG. 3 is a main flowchart illustrating a method for simplifying a point cloud in accordance with a preferred embodiment.

In step S10, the point cloud acquiring module 20 acquires the point cloud from the point cloud obtaining device 1, simulates a digitalized figure based on the point cloud, and displays the digitalized figure on the graphical user interface of any client computers 4.

In step S11, the topological structure establishing module 21 establishes a topological structure for the point cloud, namely constructing a relationship between the points of the point cloud. Detailed steps of establishing the topological structure will be depicted in FIG. 4.

In step S12, the point selecting module 22 selects a maiden point (hereinafter referred to as "selected point") from the point cloud.

In step S13, the near points searching module 23 searches a plurality of paraboloidal near points of the selected point from the point cloud according to the topological structure. Detailed steps of searching the near points will be depicted in FIG. 5.

In step S14, the curvature computing module 24 fits the selected point and the paraboloidal near points to form a paraboloid, obtains curve equations of the paraboloid according to the selected point and the paraboloidal near points, and computes a curvature of the selected point according to the curve equations and a curvature formula. Detailed steps of fitting the paraboloid and computing the curvature will be depicted in FIG. 6.

In step S15, the judging module 25 determines whether the curvatures of all points in the point cloud have been computed. If no, the procedure returns to step S12, the point selecting module 22 selects another maiden point from the point cloud.

If the curvatures of all points of the point cloud have been computed, in step S16, the point cloud simplifying module 26 simplifies the point cloud according to the curvatures of the points and a preconfigured parameter. Detailed steps of simplifying the point cloud will be depicted in FIG. 7.

Figure 4:
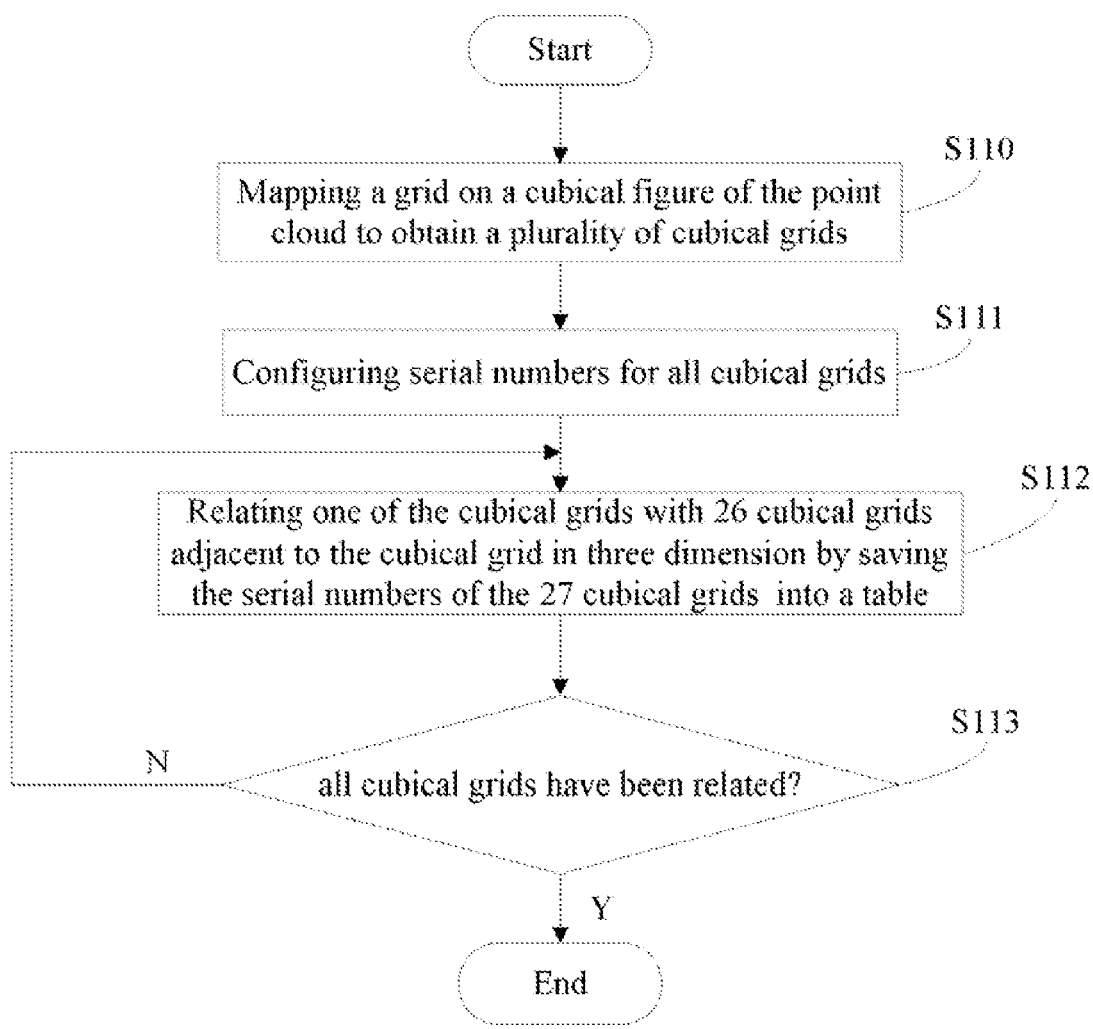
FIG. 4 is a detailed flowchart illustrating step S11 in FIG. 3.

FIG. 4 is a detailed flowchart illustrating the step S11 in FIG. 3, namely how to establish a topological structure for the point cloud.

In step S110, the topological structure establishing module 21 first identifies an outermost point on each surface edge of the point cloud by analyzing coordinates values of the points of the point cloud, and determines a cubical figure that can confine the point cloud and intersect at the outermost points of the point cloud; then the topological structure establishing module 21 retrieves a length, a width and a height of the cubical figure; finally, the topological structure establishing module 21 computes an axes quantity in surfaces of the cubical figure based on the length, the width, the height of the cubical figure and an axes interval of the grid preconfigured by the user, and then grids the cubical figure into a plurality of cubical grids according to the axes quantity of each surface of the cubical figure.

In step S111, the topological structure establishing module 21 configures serial numbers for all cubical grids of the cubical figure, for example, "001", "002", . . . , "xxx".

In step S112, the topological structure establishing module 21 relates one of the cubical grids with twenty-six cubical grids which are adjacent to the cubical grid in three dimension by saving the serial numbers of the twenty-seven cubical grids into a table.

In step S113, the judging module 25 judges whether all cubical grids have been related. If no, the procedure returns to step S112 depicted above. Otherwise, if all cubical grids have been related, the procedure ends.

Figure 5:
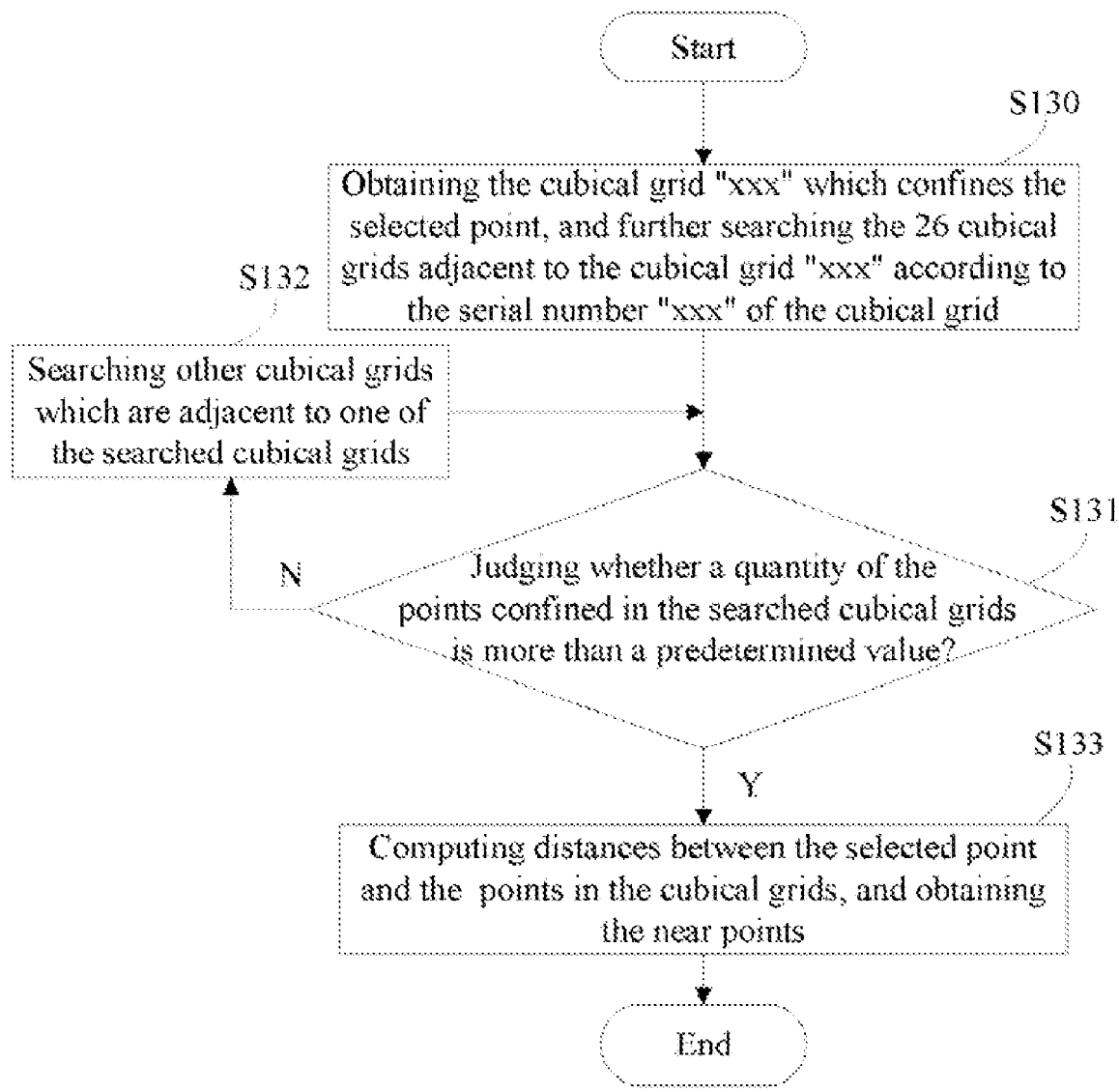
FIG. 5 is a detailed flowchart illustrating step S13 in FIG. 3.

FIG. 5 is a detailed flowchart illustrating the step S13 in FIG. 3, namely how to search the near points.

In step S130, the near points searching module 23 obtains the specified serial number "xxx" of the cubical grid which confines the selected point, and searches the twenty-six cubical grids which are adjacent to the cubical grid "xxx" from the cubical figure according to the serial number "xxx".

In step S131, the judging module 25 judges whether a quantity of the points confined in the twenty-seven cubical grids (including the cubical grid which confines the selected point and the twenty six adjacent cubical grids) is more than a predetermined value.

If the quantity is less than the predetermined value, in step S132, the near points searching module 23 searches other cubical grids which are adjacent to one of the twenty-six cubical grids which have been searched.

Until the quantity of the points confined in the searched cubical grids is more than the predetermined value, in step S133, the near points searching module 23 computes distances between the selected point and the points which confined in the searched cubical grids to obtain the near points according to the distances. The quantity of the near points may be different according to uses of the near points.

Figure 6:
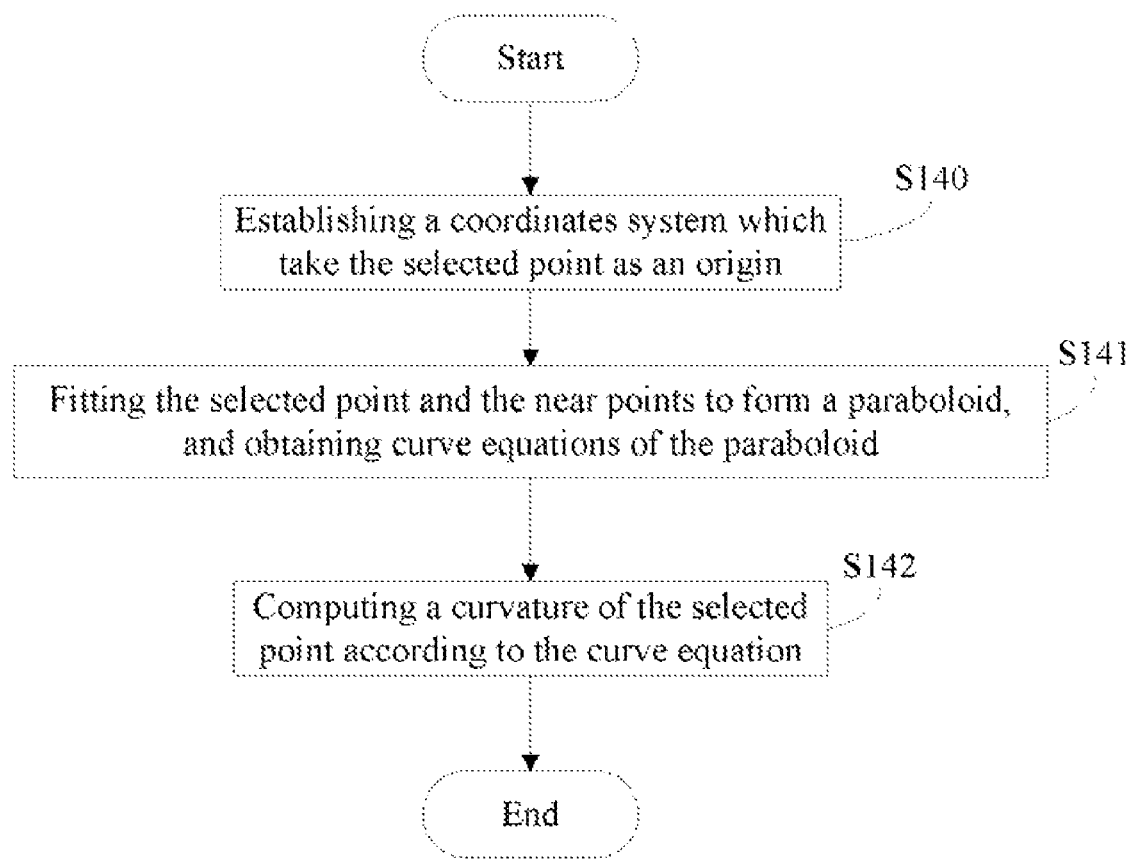
FIG. 6 is a detailed flowchart illustrating step S14 in FIG. 3.

FIG. 6 is a detailed flowchart illustrating step S14 in FIG. 3, namely how to compute a curvature of the selected point.

In step S140, the curvature computing module 24 establishes a coordinates system which takes the selected point as an origin, and computes the coordinate values of the paraboloidal near points under the established coordinated system.

In step S141, the curvature computing module 24 fits the selected point and the paraboloidal near points to form a paraboloid, and obtains the curve equations of the paraboloid:

$$a = \frac{\sum_{i=1}^{N} h_i u_i^2 - \sum_{i=1}^{N} u_i^3 v_i b - \sum_{i=1}^{N} u_i^2 v_i^2 c}{\sum_{i=1}^{N} u_i^4}$$

$$b = \frac{s_2 s_6 - s_3 s_5}{s_1 s_5 - s_2 s_4}$$

$$c = \frac{s_3 s_4 - s_1 s_6}{s_1 s_5 - s_2 s_4}$$

wherein:

$$s_1 = \sum_{i=1}^{N} u_i^2 v_i^2 \sum_{i=1}^{N} u_i^4 - \left(\sum_{i=1}^{N} u_i^3 v_i\right)^2$$

$$s_2 = \sum_{i=1}^{N} u_i^4 \sum_{i=1}^{N} u_i v_i^3 - \sum_{i=1}^{N} u_i^2 v_i^2 \sum_{i=1}^{N} u_i^3 v_i$$

$$s_3 = \sum_{i=1}^{N} h_i u_i^2 \sum_{i=1}^{N} u_i^3 v_i - \sum_{i=1}^{N} h_i u_i v_i \sum_{i=1}^{N} u_i^4$$

$$s_4 = \sum_{i=1}^{N} u_i v_i^3 \sum_{i=1}^{N} u_i^4 - \sum_{i=1}^{N} u_i^2 v_i^2 \sum_{i=1}^{N} u_i^3 v_i$$

$$s_5 = \left(\sum_{i=1}^{N} u_i^4\right)^2 - \left(\sum_{i=1}^{N} u_i^2 v_i^2\right)^2$$

$$s_6 = \sum_{i=1}^{N} u_i^2 v_i^2 \sum_{i=1}^{N} h_i u_i^2 - \sum_{i=1}^{N} h_i v_i^2 \sum_{i=1}^{N} u_i^4$$

In the above curve equations, u, v, and h respectively represents x-axis coordinate values, y-axis coordinate values and z-axis coordinate values of the selected point and the paraboloidal near points; N represents the total quantity of the selected point and the paraboloidal near points.

In step S142, the curvature computing module 24 computes the curvature of the selected point according to the curve equations by using the curvature formula:

Curvature=$(4*a*c-b^2)/2$.

Figure 7:
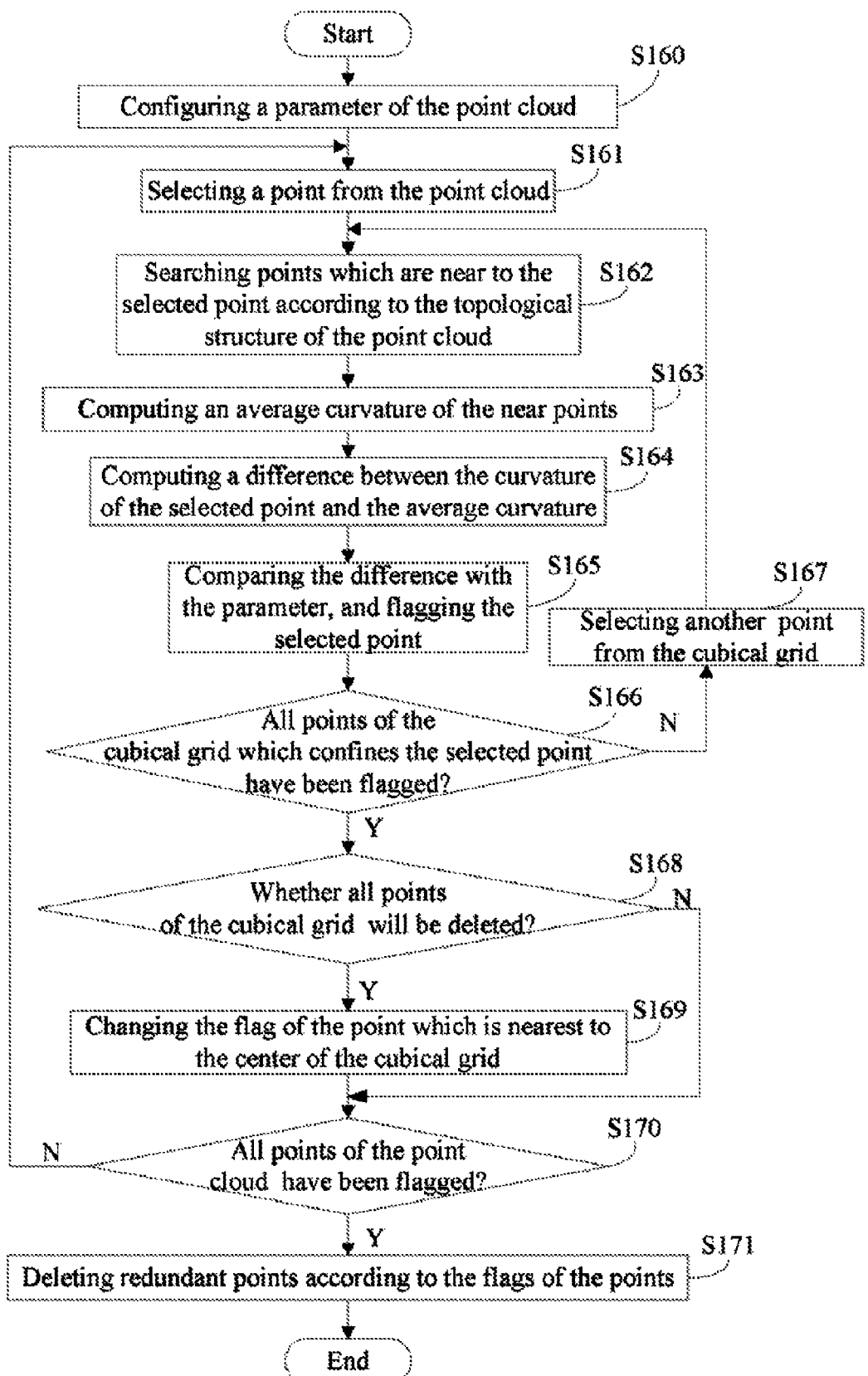
FIG. 7 is a detailed flowchart illustrating step S16 in FIG. 3.

FIG. 7 is a detailed flowchart illustrating step S16 in FIG. 3, namely how to simplify the point cloud.

In step S160, the user configures the preconfigured parameter of the point cloud.

In step S161, the point selecting module 22 selects a maiden point (hereinafter referred to as "selected point") from the point cloud.

in step S162, the near points searching module 23 searches the curvature near points according to the topological structure of the point cloud. Detailed steps of searching the near points have been depicted in FIG. 5 above.

In step S163, the point cloud simplifying module 26 computes an average curvature of the curvature near points.

In step S164, the point cloud simplifying module 26 computes a difference between the curvature of the selected point and the average curvature.

In step S165, the point cloud simplifying module 26 compares the difference with the preconfigured parameter, and flags the selected point according to result of comparison. If the difference is less than the preconfigured parameter, the selected point can be flagged, for example, as "1", which means that the selected point is a redundant point and needs to be deleted. If the difference is more than the preconfigured parameter, the selected point can be flagged, for example, as "0", which means that the selected point can not be deleted.

In step S166, the judging module 25 judges whether all points of the cubical grid which confines the selected point have been flagged. If no, in step S167, the point selecting module 22 selects another maiden point from the cubical grid, and then, the procedure returns to the step S162 depicted above.

If all points of the cubical grid which confines the selected point have been flagged, in step S168, the judging module 25 judges whether all points of the cubical grid will be deleted according to the flags of the points. If all points have been flagged as "1", namely all points of the cubical grid will be deleted, the point cloud simplifying module 26 changes the flag of the point which is nearest to the center of the cubical grid as "0", for reserving at least one point in the cubical grid.

If at least one point of the cubical grid has been flagged as "0", in step S170, the judging module 25 judges whether all points of the point cloud have been flagged. If no, the procedure returns to the step S161 as described above, the point selecting module 22 selects another maiden point.

If all points of the point cloud have been flagged, in step S171, the point cloud simplifying module 26 deletes the points which have been flagged as "1" from the point cloud.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for simplifying a point cloud, the system comprising an application server connected with a point cloud obtaining device, the application server comprising:
a point cloud acquiring module configured for acquiring a point cloud of an object from the point cloud obtaining device;
a topological structure establishing module configured for establishing a topological structure for the point cloud to make points of the point cloud confined in a plurality of related cubical grids;
a point selecting module configured for selecting a point from the point cloud as a selected point;
a near points searching module configured for searching a plurality of points which are near to the selected point according to the topological structure as near points of the selected point;
a curvature computing module configured for fitting a paraboloid for the selected point according to the near points, obtaining a curve equation of the paraboloid according to the selected point and the near points, and computing a curvature of the selected point according to the curve equation and a curvature formula; and
a point cloud simplifying module configured for simplifying the point cloud to obtain a tidy point cloud according to a preconfigured parameter and the curvatures of the points in the point cloud.

2. The system as described in claim 1, wherein the near points of the selected point are in the cubical grid which confines the selected point and/or in the cubical grids adjacent to the cubical grid which confines the selected point.

3. The system as described in claim 2, wherein the quantity of the near points is 24~32 when fitting the paraboloid.

4. The system as described in claim 1, wherein the point cloud simplifying module simplifies the point cloud by way of:
computing an average curvature of the near points of the selected point;
computing a difference between the curvature of the selected point and the average curvature; and
deleting the selected point from the point cloud if the difference is less than the preconfigured parameter; or
reserving the selected point in the point cloud if the difference is more than the preconfigured parameter.

5. The system as described in claim 4, wherein the quantity of the near points is 9~15 when computing the average curvature.

6. The system as described in claim 1, wherein the application server further comprises:
a point cloud outputting module configured for outputting the tidy point cloud on a graphical user interface of a client computer.

7. A computerized method for simplifying a point cloud, the method comprising steps of:
(a) acquiring a point cloud from a point cloud obtaining device;
(b) establishing a topological structure for the point cloud;
(c) selecting a maiden point from the point cloud as a selected point;
(d) searching a plurality of points which are near to the selected point from the point cloud according to the topological structure as near points of the selected point;
(e) fitting the selected point and the near points to form a paraboloid, obtaining curve equations of the paraboloid, and computing a curvature of the selected point according to the curve equations and a curvature formula;
(f) repeating the steps from (c) to (e) until the curvatures of all points in the point have been computed; and
(g) simplifying the point cloud according to the curvatures of the points and a preconfigured parameter.

8. The method as described in claim 7, wherein the step (b) comprises steps of:
(b1) identifying an outermost point on each surface edge of the point cloud by analyzing coordinates values of the points in the point cloud, and ascertaining a cubical figure that can confine the point cloud and intersect at the outermost points of the point cloud;
(b2) retrieving a length, a width and a height of the cubical figure;
(b3) computing an axes quantity in each surface of the cubical figure based on the length, the width, the height of the cubical figure and a axes interval of the grid preconfigured by a user;
(b4) mapping the cubical figure into a plurality of cubical grids according to the axes quantity of each surface of the cubical figure;
(b5) configuring serial numbers for all cubical grids;
(b6) relating one of the cubical grids with twenty-six cubical grids which are adjacent to the cubical grid in three-dimensions by saving the serial numbers of twenty-seven cubical grids into a table; and
repeating step (b6) until all of the cubical grids have been related.

9. The method as described in claim 8, wherein the step (d) comprises steps of:
(d1) searching a specified serial number of the cubical grid which confines the selected point, and further searching the twenty-six cubical grids adjacent to the cubical grid from the cubical figure according to the specified serial number;
(d2) judging whether quantity of the points confined in the searched cubical grids is more than a predetermined value;
(d3) searching other cubical grids which are adjacent to one of the searched cubical grids until the quantity of the points is more than the predetermined value; and
(d4) computing distances between the selected point and points confined in the searched cubical grids to obtain the near points according to the distances.

10. The method as described in claim 9, wherein the quantity of the near points in step (e) is 24~32.

11. The method as described in claim 7, wherein the step (g) comprises steps of:
   (g1) configuring the preconfigured parameter of the point cloud;
   (g2) selecting a point from the point cloud as a selected point;
   (g3) searching a plurality of near points which are near to the selected point according to the topological structure of the point cloud;
   (g4) computing an average curvature of the near points;
   (g5) computing a difference between the curvature of the selected point and the average curvature;
   (g6) comparing the difference with the preconfigured parameter, and distinctively flags the selected point according to result of comparison;
   (g7) selecting another maiden point from the cubical grid which confines the selected point, and repeating the steps from (g3) to (g6) until all points in the cubical grid which confines the selected point have been flagged;
   (g8) judging whether all points of the cubical grid need to be deleted according to the flags of all points of the cubical grid;
   (g9) changing the flag of the point which is nearest to the center of the cubical grid if all points of the cubical grid need to be deleted;
   (g10) repeating the steps from (g2) to (g9), until all points of the point cloud have been flagged; and
   (g11) simplifying the point cloud by deleting the points of the point cloud according to the flags of the points.

12. The method as described in claim 11, wherein step (g6) comprises steps of:
   flagging the selected point as "1" if the difference is less than the preconfigured parameter; and
   flagging the selected point as "0" if the difference is more than the preconfigured parameter.

13. The method as described in claim 12, wherein step (g11) comprises steps of:
   deleting the points whose flags are "1" from the point cloud; or
   reserving the points whose flags are "0" in the point cloud.

14. The method as described in claim 11, wherein the quantity of the near points in step (g3) is 9~15.

15. The method as described in claim 7, wherein the curve equations of the paraboloid are:

$$a = \frac{\sum_{i=1}^{N} h_i u_i^2 - \sum_{i=1}^{N} u_i^3 v_i b - \sum_{i=1}^{N} u_i^2 v_i^2 c}{\sum_{i=1}^{N} u_i^4}$$

$$b = \frac{s_2 s_6 - s_3 s_5}{s_1 s_5 - s_2 s_4}$$

$$c = \frac{s_3 s_4 - s_1 s_6}{s_1 s_5 - s_2 s_4}$$

wherein:

$$s_1 = \sum_{i=1}^{N} u_i^2 v_i^2 \sum_{i=1}^{N} u_i^4 - \left(\sum_{i=1}^{N} u_i^3 v_i\right)^2$$

$$s_2 = \sum_{i=1}^{N} u_i^4 \sum_{i=1}^{N} u_i v_i^3 - \sum_{i=1}^{N} u_i^2 v_i^2 \sum_{i=1}^{N} u_i^3 v_i$$

$$s_3 = \sum_{i=1}^{N} h_i u_i^2 \sum_{i=1}^{N} u_i^3 v_i - \sum_{i=1}^{N} h_i u_i v_i \sum_{i=1}^{N} u_i^4$$

$$s_4 = \sum_{i=1}^{N} u_i v_i^3 \sum_{i=1}^{N} u_i^4 - \sum_{i=1}^{N} u_i^2 v_i^2 \sum_{i=1}^{N} u_i^3 v_i$$

$$s_5 = \left(\sum_{i=1}^{N} u_i^4\right)^2 - \left(\sum_{i=1}^{N} u_i^2 v_i^2\right)^2$$

$$s_6 = \sum_{i=1}^{N} u_i^2 v_i^2 \sum_{i=1}^{N} h_i u_i^2 - \sum_{i=1}^{N} h_i v_i^2 \sum_{i=1}^{N} u_i^4$$

wherein the "u", "v", and "h" respectively represents x-axis coordinate value, y-axis coordinate value and z-axis coordinate value of the selected point and the near points, and the "N" represents a total quantity of the selected point and the near points.

16. The method as described in claim 15, wherein the curvature formula is:
Curvature=(4*a*c−b*b)/2.

* * * * *